Patented Apr. 7, 1931

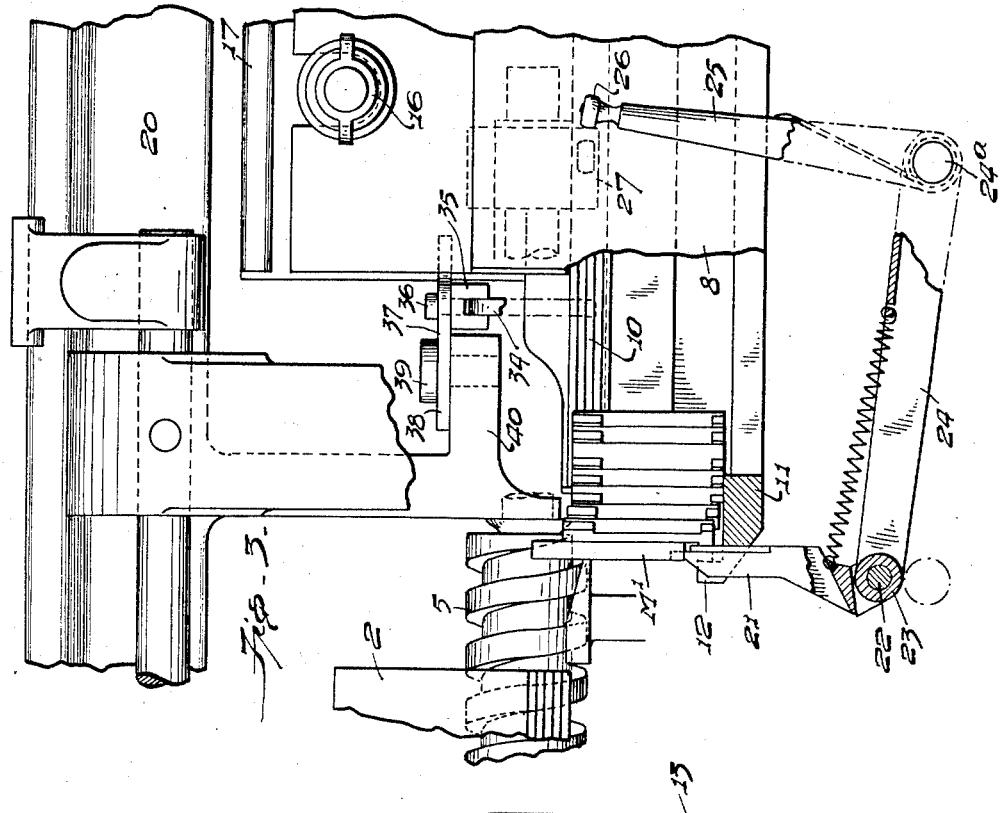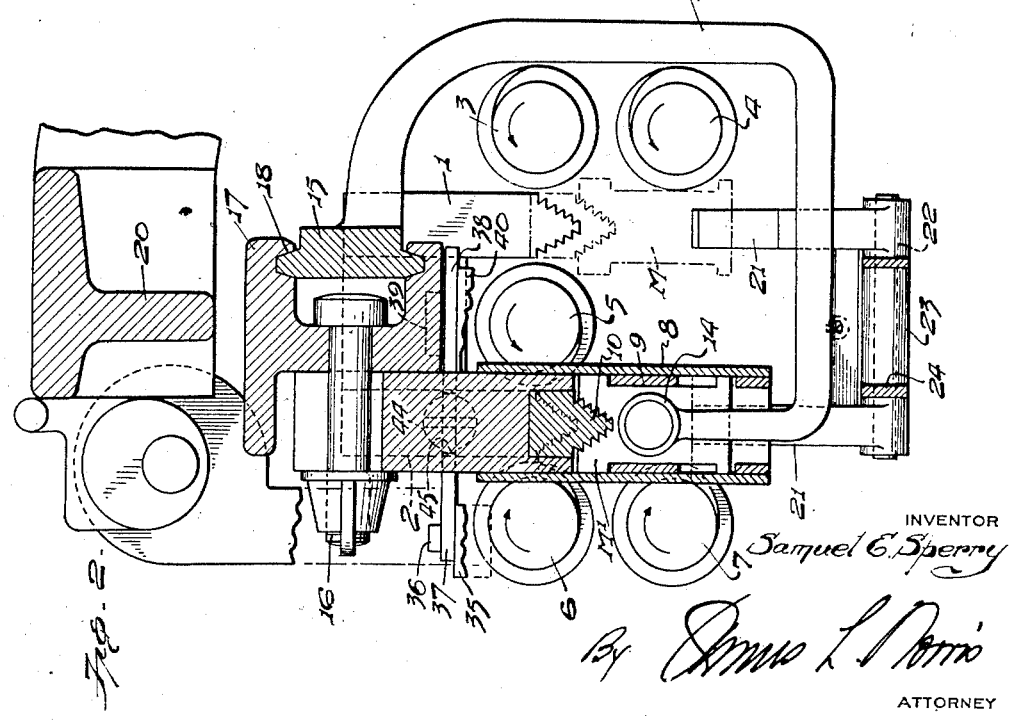

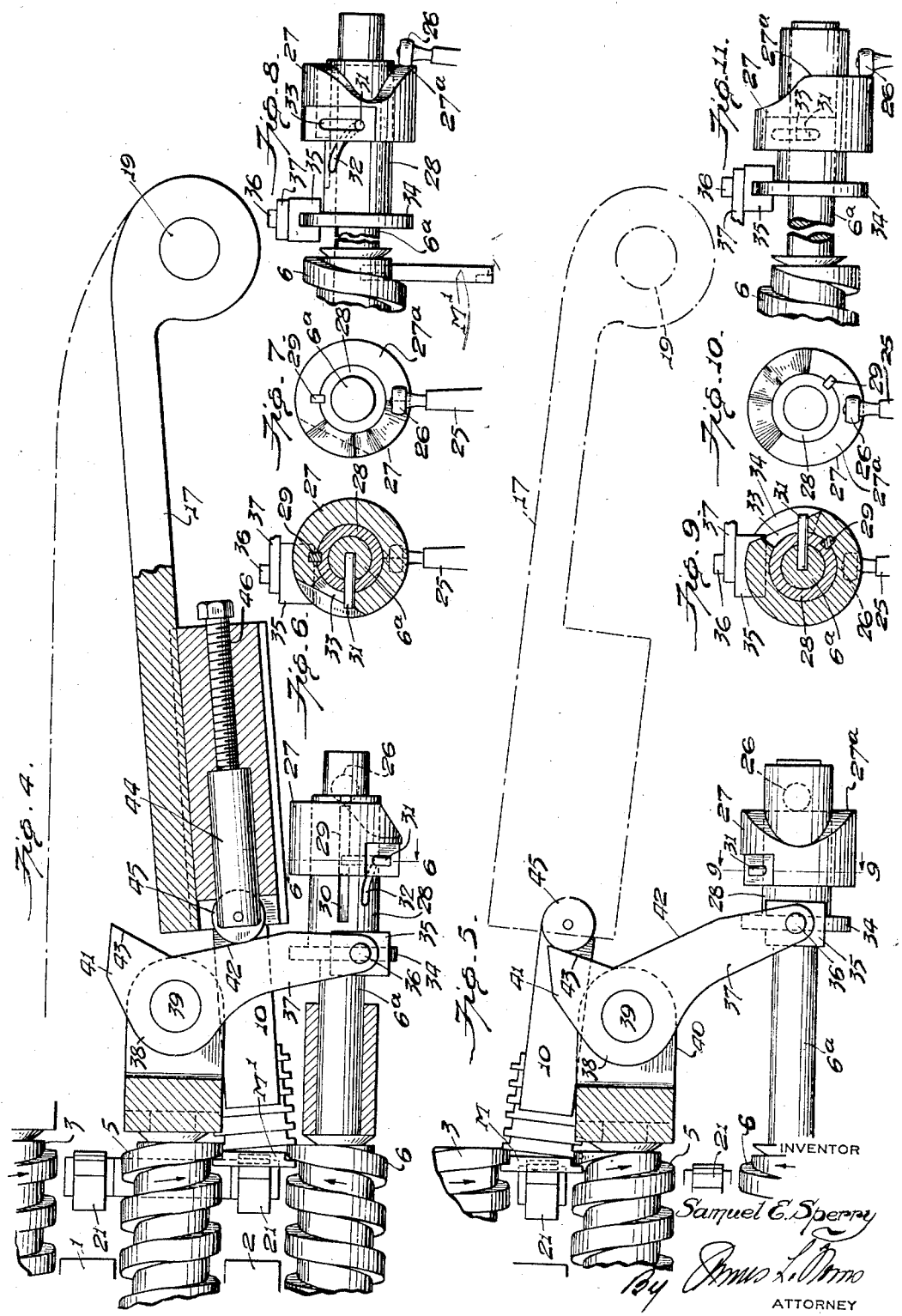

1,800,033

UNITED STATES PATENT OFFICE

SAMUEL E. SPERRY, OF HOLLIS, NEW YORK, ASSIGNOR TO INTERTYPE CORPORATION, OF BROOKLYN, NEW YORK, A CORPORATION OF NEW YORK

DISTRIBUTOR MECHANISM FOR TYPOGRAPHICAL MACHINES

Application filed July 10, 1930. Serial No. 467,105.

The present invention relates to improvements in typographical machines of the general class shown and described in U. S. Letters Patent No. 436,532 granted September 16, 1890 to O. Mergenthaler, wherein matrices stored in a magazine or magazines are assembled, together with spacers, into lines which are presented to a mold from which type bars or slugs are cast, after which the matrices composing the lines are distributed to the magazine or magazines from which they were drawn.

The invention relates more particularly to the matrix distributing mechanism of such machines and especially those of the so called "mixer" type examples of which are shown in U. S. Letters Patents Nos. 848,771 granted April 2, 1907 to J. R. Rogers and 1,202,719 granted October 24, 1916 to T. S. Homans, wherein the matrices used in composing the lines are drawn from one or another of a plurality of magazines containing matrices belonging to different fonts, so that the composed lines may contain matrices from different magazines, and the matrices used in such lines, after the casts have been made therefrom, are returned to their respective magazines by passing them through distributors arranged one next to the other end corresponding with the respective magazines.

The matrix distributing mechanism used in machines of the mixer class as generally constructed, embodies distributors arranged in a pair and having conveyer screws for advancing the matrices therethrough, a center conveyer screw being used which is common to both distributors and cooperates with the conveyer screws in both distributors to advance the matrices therethrough, the matrices being lifted into engagement with the conveyer screws in the distributors by a pair of lifting fingers reciprocating vertically in unison and at a uniform rate in relation to the rotation of the screws, but difficulties have been experienced in the use of such distributors due to the fact that while the thread at one side of the center screw may be properly timed with the lifting finger for one distributor to properly engage the matrices therewith and with the conveyer screws in that distributor, the thread of the center screw at the opposite side thereof and which cooperates with the matrices in the other distributor and the threads of the cooperating conveyer screws which are timed with the thread at said opposite side of the center screw are out of timed relation with the lifting finger for said other distributor, in consequence of which striking of the matrices on the crests of the threads of the conveyer screws in the latter distributor instead of entering the grooves between the threads therein has resulted, causing damage to the matrices.

Efforts have been made to obviate these difficulties by cutting away the threads at the entrance or matrix-receiving ends of the screws in one of the distributors so that the screws in this distributor will allow the matrices to be lifted by the lifting finger without striking the crests of the threads, but such cutting away of the threads of the screws allows the matrices to become twisted and liable to be bent or otherwise damaged.

The primary object of the present invention is to provide means for timing the lifting of the matrices into the different distributors to correspond with the different timing of the conveyer screws therein, thereby insuring proper reception of the matrices in the grooves between the threads of the conveyer screws in the different distributors, although the matrix lifting means for the different distributors may operate in unison, thereby avoiding the necessity of cutting away the entrance ends of the threads of any of the conveyer screws and avoiding the difficulties resulting from such practice.

A further object of the invention is to provide means for automatically timing the lifting of the matrices into one or another of a plurality of distributors to conform with the different timing of the conveyer screws therein, in matrix distributing mechanism employing a shiftable distributor box for directing the matrices to one or another of such distributors, the variation in the timing of the matrix lifting means being effected automatically by the shifting of the distributor box or equivalent matrix directing means to direct the matrices to one or another of the distributors.

To these and other ends, the invention consists in certain improvements and combinations and arrangements of parts all as will be hereinafter more fully described, the features of novelty being pointed out particularly in the claims at the end of the specification.

In the accompanying drawings:—

Fig. 2 represents a transverse vertical section through the matrix distributing mechanism shown in Fig. 1;

Fig. 3 is a rear elevation of the matrix distributing mechanism shown in Fig. 2 as viewed from the left, portions of the structure being broken away for clearness;

Figure 1:
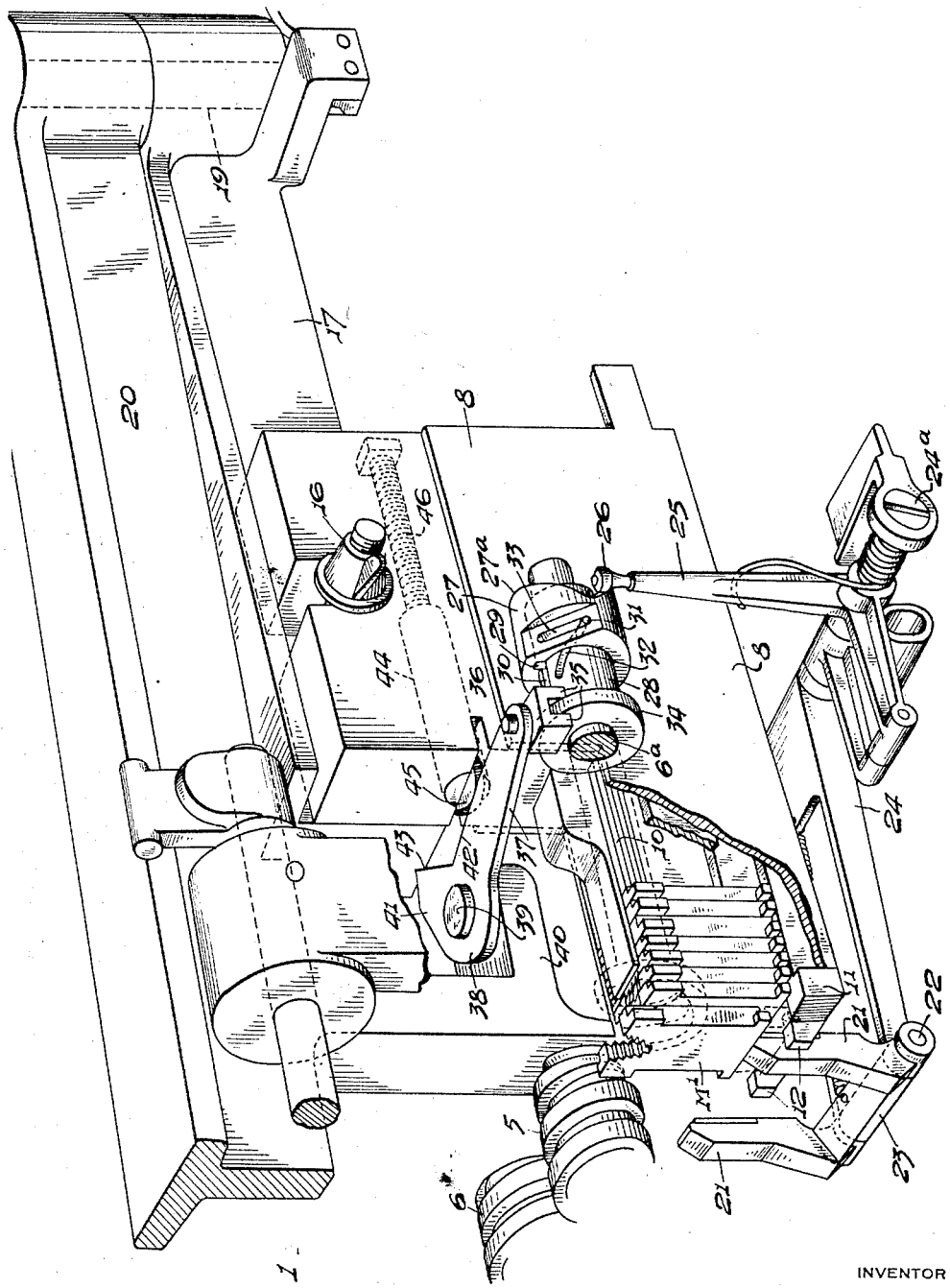
Fig. 1 is a perspective view, partly in section, of the matrix-receiving end of distributing mechanism embodying the present invention.

Fig. 4 is a fragmentary horizontal sectional view through the swinging distributor box, showing the adjacent matrix-receiving ends of the conveyer screws of the distributors and illustrating the means for automatically timing the lifting of the matrices into the distributors according to the position occupied by the distributor box, the latter being set to direct matrices into the rear distributor;

Fig. 5 is a view similar to Fig. 4 but showing the distributor box set to direct matrices into the front distributor and the timing means for the matrix lifters shifted accordingly;

Fig. 6 is a detail sectional view through the operating cam for the matrix lifters, taken on the line 6—6 of Fig. 4;

Fig. 7 is a face view of the operating cam for the matrix lifters as viewed from the right in Fig. 4;

Fig. 8 is a rear elevation of the operating cam for the matrix lifters, set as shown in Fig. 4;

Fig. 9 is a detail sectional view through the operating cam for the matrix lifters, taken on the line 9—9 of Fig. 5;

Fig. 10 is a face view of the operating cam for the matrix lifters as viewed from the right in Fig. 5; and Fig. 11 is a rear elevation of the operating cam for the matrix lifters as viewed from the rear in Fig. 5.

Similar parts are designated by the same reference characters in the different figures.

The present invention is applicable generally to matrix distributing mechanisms of the kind used in typographical machines of the class hereinbefore referred to and embodying a plurality of magazines containing matrices belonging to different fonts and from which matrices may be drawn as desired for assembly into lines for the casting of type bars or slugs therefrom in the usual or well known manner, the distributing mechanism comprising distributors for the respective magazines arranged one in front of the other or in otherwise adjacent relationship and having shiftable means, such as a pivoted or swinging distributor box of the kind shown in the Homans patent hereinbefore referred to for directing the matrices belonging to the different fonts into one or another of the distributors whereby the matrices used in each line, after a cast has been made therefrom may be returned to the magazines from which they were drawn. The preferred embodiment of the invention is shown in the accompanying drawings and will be hereinafter described in detail, but it is to be understood that the invention is not restricted to the precise construction shown since equivalent constructions are contemplated and such will be included within the scope of the claims.

In the present instance, the invention is shown applied to distributing mechanism of the kind illustrated and described in the Homans patent hereinbefore referred to, it comprising adjacently located front and rear distributors embodying combination bars 1 and 2 respectively which may be of the usual or well known kind having longitudinal ribs on their lower edges to engage correspondingly formed teeth at the upper edges of matrices M and M' respectively, the ribs on these bars being appropriately interrupted at certain points in the length of the distributor to cause dropping of the matrices to their respective channels in the magazines. The matrices are suspended from these combination bars while being advanced in the distributors, and the matrices M are advanced in the front distributor by a pair of conveyer screws 3 and 4 arranged in front of the combination bar 1 by engagement with the upper and lower lugs or ears on the forward edge of these matrices and by a conveyer screw 5 which is arranged behind the combination bar 1 and cooperates with the lugs or ears on the upper rear corners of these matrices; and the matrices M' are advanced in the rear distributor by conveyer screws 6 and 7 which are arranged behind the combination bar 2 and cooperate with the lugs or ears on the rear edges of these matrices suspended from said bar and by the screw 5 which cooperates with the lugs or ears on the upper forward corners of these matrices M' in the rear distributor. The combination bars 1 and 2 are mounted in fixed position in the upper portion of the machine above the entrances to the magazines and suitable means may be provided for directing the matrices, as they drop from these bars into their respective channels in the magazines, as is usual. The conveyer screws for the front and rear distributors are journalled in bearings arranged in fixed relation to the combination bars 1 and 2 and are connected by gearing such as that shown in the Homans patent referred to whereby these screws will be driven continuously at the same speed and in the directions indicated by the arrows in Fig. 2, the screw 5 being common to both distributors and having a right-hand thread thereon conforming with that on each of the screws 3 and 4 and rotating in the same direction with those screws, and the screws 6 and 7 having left-hand threads thereon and rotating opposite to the direction of rotation of the screw 5.

The matrices of each line, after a type bar or slug has been cast therefrom, and which matrices may require distribution to different magazines in the machine, are directed into one or the other of the two distributors for return to their respective magazines by a distributor box 8, the construction and mode of operation of which may be the same as that shown in the Homans patent hereinbefore referred to, and to which reference is made for a detail description thereof, it being deemed sufficient for the present purposes to describe this box as having a channel 9 therein through which the matrix line may move endwise, they being supported by a rail 10 which extends longitudinally through the distributor box and is ribbed to engage the teeth in the upper edges of the matrices so that they will be suspended to slide longitudinally thereon and rails 11 extend beyond the end of the rail 10 and are provided with upturned lugs 12 against which the foremost matrix in the line abuts. The matrix line is brought to the matrix-receiving end of the distributor box by the usual second elevator of the machine and the matrix line is pushed through the distributor box by an arm 13 one end of which projects upwardly through the open bottom of the distributor box and is provided with a head 14 which engages the rearmost matrix in the line and the other end of which is connected to a slide 15 which corresponds with and may be operated like the distributor shifter slide commonly used in machines of this class, said arm and slide serving to feed the matrix line against the lugs 12 which act as stops.

The distributor box is secured by a clamp screw 16 to a bracket 17, the latter also having a guideway 18 formed therein for the slide 15, and this bracket is pivoted by a vertical pivot 19 to a stationary arm or beam 20 which forms a part of the frame of the machine, this pivotal mounting of the bracket 17 and the distributor box 8 carried thereby enabling the distributor box to swing either into the position shown in Fig. 4 to direct matrices into the rear distributor or into the position shown in Fig. 5 to direct matrices into the front distributor. The swinging of the distributor box into one or the other of these positions may be accomplished automatically under control of the matrices themselves by means such as that shown and described in the Homans patent hereinbefore referred to.

The matrices are lifted successively into one or the other of the distributors by a pair of matrix lifting fingers 21 which are arranged in a pair and beneath the respective distributors, these fingers being connected to a common shaft 22 which is rotatably mounted in a bearing 23 on the outer end of a matrix lift lever 24, the latter being mounted to rock on a shaft 24ª which is supported in a relatively fixed part of the distributing mechanism, and the lever 24 is operatively connected to a matrix lift cam lever 25 which carries a roller 26 at its upper end. The matrix lifting fingers 21 are so arranged that one or the other thereof will be brought beneath the foremost matrix in the line resting against the stops 12 when the distributor box is set to direct the matrices into one or the other of the distributors, as is shown in Figs. 4 and 5, it being understood that these matrix lifting fingers reciprocate vertically in unison and that these lifting fingers will be displaced to permit shifting of the distributor box in the manner described in said Homans patent.

In matrix distributing mechanism of the kind described above as heretofore constructed, the matrix lifting fingers have been actuated in invariable relationship with the conveyer screws of the distributors by a cam fixed on the end of one of the screws and cooperative with the roll on the upper end of the matrix lift cam lever, but difficulties have been experienced in the introduction of matrices into the different distributors due to the fact that while the center conveyer screw 5 and the cooperating conveyer screws of one distributor may be so timed with the matrix lifting fingers as to enable the lugs or ears on the matrices to be appropriately received in the grooves between the threads of these screws, the center screw 5 and the cooperating screws of the other conveyer will be out of time with the matrix lifters, due to the difference in timing of the thread at opposite sides of the center screw, so that the matrices would strike the crests of the screws in such other distributor, and while efforts have been made to obviate this difficulty by cutting away the threads of the conveyer screws at the entrance or matrix-receiving ends thereof, such efforts have not been successful since the cut away threads would allow the matrices to become twisted and consequently bent or damaged.

The present invention provides means for automatically timing the matrix lifting fingers with the screws in the respective distributors when the swinging distributor box is shifted to direct the matrices into one or the other of the distributors, by altering the position or timing of the operating cam for the matrix lifting fingers relatively to the conveyer screws of the distributors. In the preferred construction shown in the present instance, the cam 27 which cooperates with the roller 26 to actuate the matrix lifting fingers is adjustably mounted on the end of the conveyer screw 6 so that the timing of the operation of the matrix lifting fingers may be advanced or retarded relatively to the timing of the conveyer screws. As shown, the cam 27 is mounted on a sleeve 28 which latter is rotatable and also slidable axially on the cylindrical end 6ª of the screw 6 and is slidable axially within the cam, the cam being caused to rotate with the sleeve 28 by a key 29 fixed in the cam and engaging slidably in a keyway 30 extending axially in the sleeve, said key and keyway thus forming a spline connection between the cam 27 and the sleeve 28, and a pin 31 is fixed to and extends radially from the extension 6ª of the screw, this pin extending outwardly through an inclined or helical slot 32 formed in the sleeve 28 to cause rotation of the sleeve and cam when the sleeve is shifted axially, and through a slot 33 in the cam which extends in the plane of rotation thereof to prevent axial displacement of the cam on the end of the screw. One end of the sleeve 28 is formed with a circular flange 34 which is engaged by a fork 35, this fork being pivotally mounted by the pivot pin 36 thereon upon one arm 37 of a lever 38, this lever being pivoted by a pivot pin 39 to a bracket 40 which forms a relatively fixed part of the distributing mechanism, and the lever 38 has an arm 41 which extends to the side of the pivot 39 opposite to the arm 37. The arms 37 and 41 of the lever 38 are formed with relatively divergent tracks or edges 42 and 43, and the distributor box carries a plunger 44 fitted at one end with a roller 45 arranged opposite to said tracks, the plunger 44 being set or adjusted longitudinally to bring the roller 45 into correct working relationship with the tracks 42 and 43 by a screw 46 located behind it in the distributor box.

The operation of the matrix lifting mechanism as just described is as follows:—

While the matrices are being introduced into the rear distributor as shown in Fig. 4, the cam 27 will occupy the position shown in that figure and in Figs. 6, 7 and 8, the roller 45 movable with the distributor box engaging the track 42 on the lever 38 and holding the latter in a position where the sleeve 28 will be in the left-hand position, the pin 31 being at the rear end of the slot 33 in the cam 27 so that the latter will be in relatively advanced position and the high portion 27ª of the cam will be in engagement with the roller 26 so that the matrix-lifting fingers will be lifted in proper timed relationship with the center screw 5, and the rear screws 6 and 7 to lift the foremost matrix M' into the grooves between the threads of these screws which are then immediately above such matrix, and while the distributor box is set to direct matrices into the rear distributor, the cam 27 will be held by the lever 38 in such advanced position to thus time the matrix lifting fingers with the conveyer screws which receive and advance the matrices in the rear distributor. Shifting of the distributor box into the position shown in Fig. 5 to introduce one or more matrices into the front distributor causes the roller 45 to ride off the track 42 and on to the track 43 of the lever 38 and due to the divergent relationship of these tracks at opposite sides of the pivot of this lever, the latter will be swung about its pivot from the position shown in Fig. 4 into the position shown in Fig. 5, and this swinging movement of the lever 38 causes the fork 35 which engages the flange 34 on the sleeve 28 to shift this sleeve toward the right or from the left-hand position shown in Fig. 4 into the right-hand position shown in Fig. 5, and due to the inclination or helical position of the slot 32 in this sleeve through which the pin 31 projects, the sleeve 28 will be rotated in a direction opposite to that in which the screw 6 revolves or into a relatively retarded position, the pin 31 being thus brought to the forward end of the slot 33 in the cam 27 as shown in Fig. 9, and this alteration in the timing of the cam will bring the matrix-lifting fingers into proper timed relation with the conveyer screws 3, 4 and 5 which receive and advance the matrices through the front distributor, the high portion 27ª of the cam being thus brought into position to act on the roller 26 to raise the matrix lifting fingers at the moment the grooves between the threads of the screws in the front distributor are directly above the matrix to be introduced therein, Fig. 5 showing the conveyer screws rotated from the position shown in Fig. 4 so that the screws of the front distributor will be in position to receive in the grooves thereof the matrix M at the moment it is lifted by the respective matrix-lifting finger. Swinging of the distributor box from the position shown in Fig. 5 to the position shown in Fig. 4 to direct matrices to the rear distributor causes the roller 45 to be removed from the track 43 and to ride upon the track 42 on the lever 38, thereby swinging this lever from the position shown in Fig. 5 into that shown in Fig. 4 and shifting the sleeve 28 toward the left or into the position shown in Fig. 4, the helical slot 32 in this sleeve engaging the pin 31 causing the sleeve and the cam 27 thereon to be rotated in the direction of rotation of the screw 6 or into a relatively advanced position as shown in Figs. 6, 7 and 8 and thereby bringing the high point 27ª of the cam into position to effect lifting of the matrix M' into the rear distributor at the moment the grooves between the threads of the conveyer screws for this distributor are directly above such matrix.

From the foregoing, it will be understood that the shiftable cam for the matrix-lifting fingers and the shifting means therefor controlled by the shifting of the pivoted distributor box will automatically alter the timing of the lift of the matrix-lifting fingers to bring the timing thereof into conformity with that of the conveyer screws for the front and rear distributors so that the matrices will be lifted into one or the other of these distributors at the moment the grooves between the threads of the conveyer screws in these distributors are above the matrices about to be lifted into engagement therewith, this automatic timing of the lift of the matrix-lifting fingers being effected without requiring the attention of the operator of the machine and avoiding the necessity of cutting away any of the threads of the conveyer screws.

I claim as my invention:—

1. In matrix distributing mechanism for typographical machines embodying a plurality of distributors having differently timed screws for conveying the matrices therein, and matrix lifting means for lifting the matrices into engagement with the screws of said distributors, a cam for actuating said matrix lifting means, said cam being adjustable to set it in timed relations with the screws of the different distributors.

2. In matrix distributing mechanism for typographical machines embodying a plurality of distributors having differently timed screws for conveying the matrices therein, and matrix lifting means for lifting the matrices into engagement with the screws of said distributors, a cam for actuating said matrix lifting means, and means for setting said cam in different timed positions to conform with the different timing of the screws of said distributors.

3. In matrix distributing mechanism for typographical machines embodying a plurality of distributors having differently timed screws for conveying the matrices therein, shiftable means for directing matrices to one or another of said distributors, and matrix lifting means for engaging the matrices with the screws in said distributors, a cam for actuating said matrix lifting means, and means controlled by said shiftable matrix directing means for setting said cam in timed relation with the screws of the respective distributors.

4. In matrix distributing mechanism for typographical machines embodying a plurality of distributors having differently timed screws for conveying the matrices therein, shiftable means for directing matrices to one or another of said distributors, and matrix lifting means for engaging the matrices with the screws in said distributors, a cam for actuating said matrix lifting means, and means operative by movement of said shiftable means for varying the timing of said cam to conform with that of the screws of the distributors to which said shiftable means is set to direct matrices.

5. In matrix distributing mechanism for typographical machines embodying a plurality of distributors having differently timed screws for conveying the matrices therein, shiftable means for directing matrices to one or another of said distributors, and matrix lifting means for engaging the matrices with the screws in said distributors, a cam for actuating said matrix lifting means, and means operative by the movement of said shiftable means for advancing or retarding the timing of said cam to conform with the timing of the screws of one or another of said distributors.

6. In matrix distributing mechanism for typographical machines embodying a plurality of distributors having differently timed screws for conveying the matrices therein, shiftable means for directing matrices to one or another of said distributors, and matrix lifting means for engaging the matrices with the screws in said distributors, a cam driven from one of said screws for actuating the matrix lifting means, and means operative by the movement of said shiftable matrix directing means for rotating said cam relatively to the screw driving it to vary the timing of the cam to conform with that of the screws of one or another of the distributors.

7. In matrix distributing mechanism for typographical machines embodying a plurality of distributors having differently timed screws for conveying the matrices therein, shiftable means for directing matrices to one or another of said distributors, and matrix lifting means for engaging the matrices with the screws in said distributors, a cam for actuating said matrix lifting means, a sleeve rotatably and axially movable on one of said screws and splined to the cam for rotating the latter relatively to said screw, and means operated by the movement of said shiftable matrix directing means for shifting said sleeve axially.

8. In matrix distributing mechanism for typographical machines embodying a plurality of distributors having differently timed screws for conveying the matrices therein, shiftable means for directing matrices to one or another of said distributors, and matrix lifting fingers reciprocatory in unison for engaging the matrices with the screws of said distributors, a cam for actuating said matrix lifting fingers, means for driving said cam, means for adjusting the cam to advance or retard its timing, a lever operatively connected to the cam adjusting means and having reversely positioned portions, and means movable by the shifting of said shiftable matrix directing means and cooperative with said reversely positioned portions of said lever for adjusting the cam.

In testimony whereof I have hereunto set my hand.

SAMUEL E. SPERRY.